Dec. 31, 1957   M. D. ADCOCK ET AL   2,818,549
ANTENNA COUPLING NETWORK
Filed Feb. 5, 1954   2 Sheets-Sheet 2
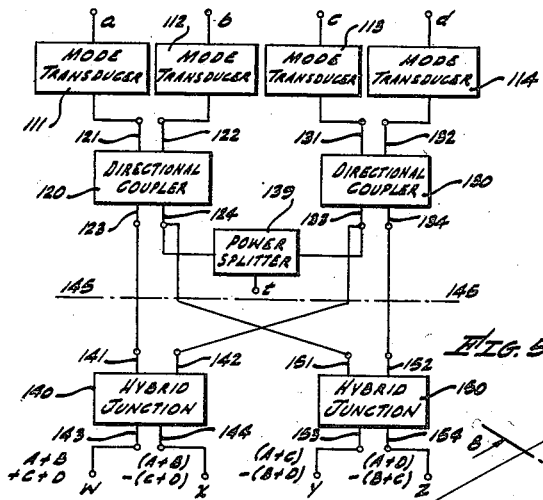
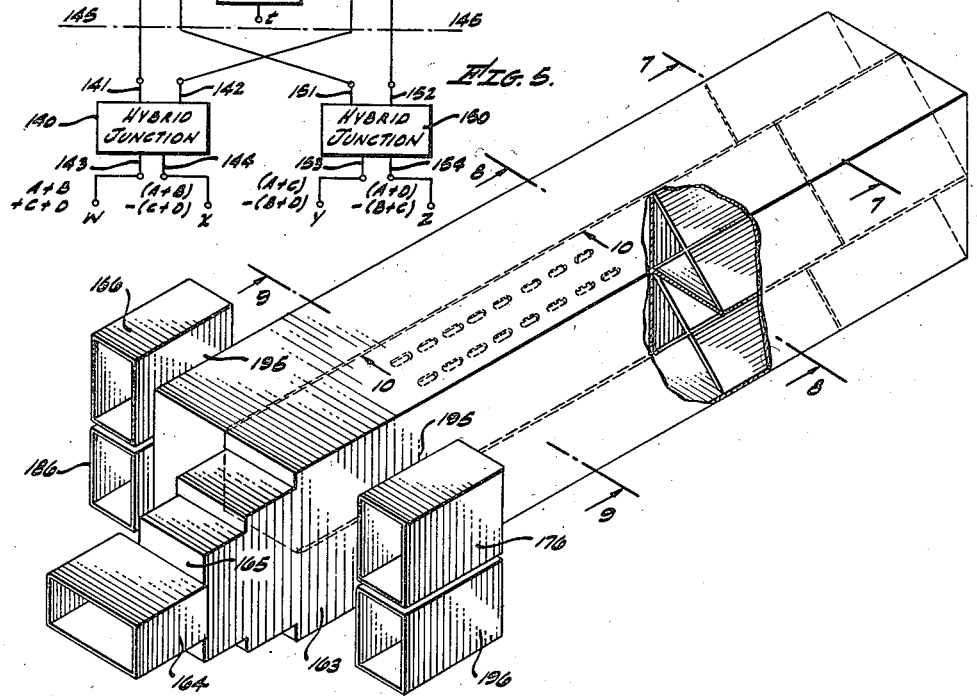
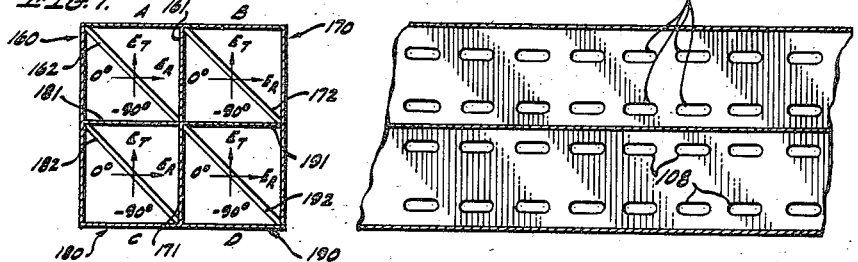
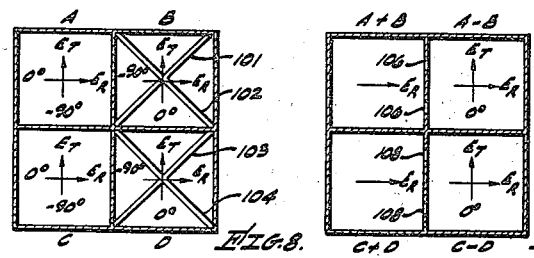
INVENTOR.
MACK D. ADCOCK,
LOUIS A. KURTZ,
BY
THEIR ATTORNEY.

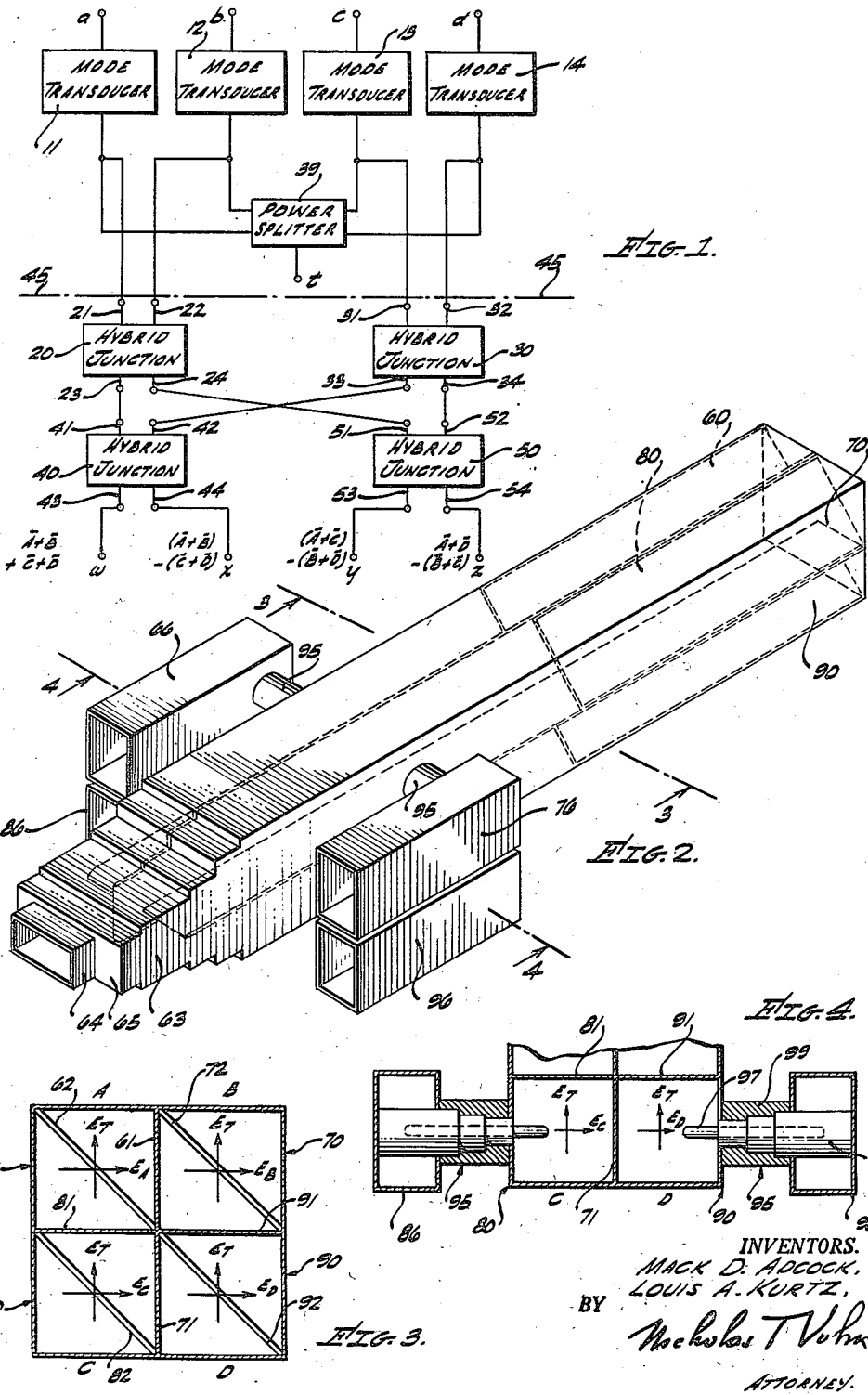

United States Patent Office 2,818,549
Patented Dec. 31, 1957

2,818,549

ANTENNA COUPLING NETWORK

Mack D. Adcock, Pacific Palisades, and Louis A. Kurtz, Los Angeles, Calif., assignors to Hughes Aircraft Company, Culver City, Calif., a corporation of Delaware Application February 5, 1954, Serial No. 408,473

17 Claims. (Cl. 333—11)

This invention relates generally to waveguides for electromagnetic waves and, more particularly, to an antenna coupling network for use in a radar system of the simultaneous lobe comparison type.

It has often been found desirable to automatically track an isolated target by means of a simultaneous lobe comparison radar system thereby avoiding the difficulties associated with antenna scanning. In a radar system of this type, signal pulses are directed toward a target in space by means of an antenna having four distinct radiating elements. Consequently, for each target echo of a transmitted pulse, four signal components are received by the antenna elements. By combining these signal components in a waveguide network, coupled to the antenna, it is then possible to produce error signals representative of the bearing of the target.

More particularly, a conventional simultaneous lobing antenna comprises a parabolic reflector and four identical radiating elements arranged in a square. Since the center of the square is made substantially coincident with the focus of the reflector, signal pulses fed to the radiating elements are reflected in the form of a relatively narrow beam of pulsed radiant energy. Assuming that the beam is intercepted by an isolated target positioned on the axis of the beam, and at a distance not exceeding the range capabilities of the system, four signal components of equal amplitude and phase will be received by the radiating elements for each echo of a radiated pulse. If, on the other hand, the target is located off the axis of the beam, there will be received four signal components having amplitudes and phases which differ from each other in accordance with the bearing of the target relative to the axis of the beam. To locate the target in this event, the signal components are variously added and subtracted by the waveguide network in a manner to produce the required error signals. If the signal components be designated A, B, C, and D, these error signals comprise the combinations $[(A+B)-(C+D)]$, and $$[(A+C)-(B+D)]$$

which are referenced to a range signal $[A+B+C+D]$.

Recently, it has been recognized that certain advantages may be obtained if circularly polarized wave pulses are radiated by the antenna rather than linearly polarized wave pulses as was the practice hitherto. In this way, there is effected a reduction in amplitude fluctuations of the echo pulses caused by changes in the aspect of the target. Also false indications of a target due to the presence of raindrops are minimized.

It is an object of this invention, therefore, to provide a waveguide network which supplies equal amounts of circularly polarized wave energy to the radiating elements of a simultaneous lobing antenna, and which derives from the signal components of a target echo received by the antenna, error signals representative of the bearing of the target.

It is another object of this invention to provide a waveguide network which serves to convert linearly polarized wave energy to circularly polarized wave energy, and which distributes the circularly polarized wave energy equally to four separate terminals.

It is a further object to provide a sum and difference circuit which operates on four signal components A, B, C, and D, consisting of circularly polarized wave pulses to produce in the form of linearly polarized wave pulses the combinations $[A+B+C+D]$, $[(A+B)-(C+D)]$, and $[(A+C)-(B+D)]$.

The novel features which are believed to be characteristic of this invention, both as to its organization and method of operation, together with further objects and advantages thereof, will be better understood from the following description considered in connection with the accompanying drawings in which:

Fig. 1 is a block diagram of the waveguide network according to this invention;

Fig. 2 is a perspective view of a structural embodiment of the waveguide network illustrated in block form in Fig. 1;

Figs. 3 and 4 are sectional views taken on lines 3—3 and 4—4, respectively, of Fig. 2;

Fig. 5 is a block diagram of a modification of the waveguide network of Fig. 1;

Fig. 6 is a perspective view of a structural embodiment of the modified waveguide network illustrated in block form in Fig. 5; and Figs. 7–10 are sectional views taken on lines 7—7 through 10—10 of Fig. 6.

Referring now to Fig. 1 of the drawing, there are illustrated mode transducers 11, 12, 13, 14, a power splitter 39, and hybrid junctions 20, 30, 40, and 50. Each of the hybrid junctions has four arms designated 21–24, 31–34, 41–44, and 51–54; arms 21 and 22, 31 and 32, 41 and 42, 51 and 52 being related conjugately. Nine terminals $a$, $b$, $c$, $d$, $t$, $w$, $x$, $y$, and $z$ terminate the waveguide network of this invention.

Terminals $a$, $b$, $c$, and $d$ are coupled to power splitter 39 and to arms 21, 22, 31, 32 of hybrid junctions 20 and 30 through mode transducers 11, 12, 13, and 14, respectively. In turn, power splitter 39 is connected to terminal $t$; and hybrid junctions 20 and 30 interconnect with hybrid junctions 40 and 50 as follows: arm 23 connects to arm 41, arm 24 connects to arm 51, arm 33 connects to arm 42, and arm 34 connects to arm 52. The remaining arms 43, 44, 53, and 54 of hybrid junctions 40 and 50 are terminated at $w$, $x$, $y$, and $z$, respectively.

In operation, wave energy having a fixed plane of polarization, that is, linearly polarized wave energy, is supplied to power splitter 39 from terminal $t$. Power splitter 39 divides the wave energy into four equal portions for transmission to mode transducers 11, 12, 13, and 14, respectively. By means of mode transducers 11, 12, 13, and 14, the linearly polarized wave energy is first converted to circular polarization and then presented to terminals $a$, $b$, $c$, and $d$. Accordingly, there is available at terminals $a$, $b$, $c$, and $d$ equal amounts of circularly polarized wave energy for transmission to a simultaneous lobing antenna.

Alternatively, there are received at terminals $a$, $b$, $c$, and $d$ signal components A, B, C, and D, respectively, consisting of circularly polarized waves. These circularly polarized waves are supplied to mode transducers 11, 12, 13, and 14 which, in this case, operate in reverse fashion. That is, signal components A, B, C, and D are converted to linearly polarized waves for transmission to arms 21, 22, 31, and 32, respectively, of hybrid junctions 20 and 30. By means of hybrid junction 20, components A and B are combined with the result that the somplex sum $(A+B)$ appears in arm 23, and the complex difference $(A-B)$ is produced in arm 24. In like manner, the sum $(C+D)$ and the difference $(C-D)$ are provided in arms 33 and 34 of hybrid junction 30. Finally, range signal [A+B+C+D] and error signals $$[(A+B)-(C+D)]$$
$$[(A+C)-(B+D)]$$
$$[(A+D)-(B+C)]$$

are produced at terminals w, x, y, and z, respectively, by combining (A+B) with (C+D) in hybrid junction 40; and (A−B) with (C−D) in hybrid junction 50.

There is illustrated in Figs. 2–4 a structural embodiment of a portion of the waveguide network of this invention and, in particular, that portion above line 45—45 of Fig. 1. Referring now to Figs. 2–4, it is seen that the illustrated portion of the waveguide network includes four waveguides 60, 70, 80, and 90 of square cross section. Waveguide 60 extends adjacent waveguide 70 and is separated therefrom by a common waveguide wall 61. Waveguides 80 and 90, which are similarly disposed, share a common wall 71. Waveguides 60 and 70 overlie waveguides 80 and 90, respectively, with additional common walls 81 and 91 therebetween.

Included in a longitudinal region of the waveguides 60, 70, 80, and 90 towards the right of Fig. 2 are dielectric plates 62, 72, 82, and 92, respectively. These dielectric plates are disposed parallel to one another and extend between diagonally opposite corners of the respective waveguides as shown in Fig. 3. Towards the left of Fig. 2, the ends of waveguides 60, 70, 80, and 90 are joined to a transitional waveguide section 63 which, in turn, is adapted to receive a waveguide 64 of rectangular cross section. To this end, the width of section 63 is made equal to the combined widths of an adjacent pair of waveguides, such as waveguides 60 and 70, whereas the height of section 63 is reduced from the combined heights of waveguides 60 and 80, or waveguides 70 and 90, to a height which is slightly greater than that of waveguide 64. This reduction in the height of section 63 is accomplished by means of steps provided in the horizontal walls of section 63 as shown in Fig. 2. To couple waveguide 64 to section 63, the end of section 63 remote from waveguides 60, 70, 80, and 90 is closed by a wall 65 including an aperture conformed in outline to waveguide 64. Waveguide 64 is joined to wall 65 about this aperture. Waveguide walls 61, 71, 81, and 91 are extended into section 64 for a distance of approximately two-thirds its length so as to provide a smooth transition between square waveguides 60, 70, 80, 90, and rectangular waveguide 64.

Also coupled to waveguides 60, 70, 80, and 90 are rectangular waveguides 66, 76, 86, and 96, respectively. With reference to Fig. 4, it may be observed that the coupling devices in this case each comprise a conductive rod 97, a dielectric support member 98, and a cylindrical member 99. Cylindrical member 99, which is coaxial with rod 97, and support member 98 has an inner diameter of varying dimension to provide the necessary impedance transformation between the waveguides. Support member 98 has an outer diameter conforming to the inner diameter of cylindrical member 99 and is apertured to receive rod 97. With reference to waveguides 90 and 96, for example, it is seen that rod 97 projects through support member 98 and into the waveguides 90 and 96, the adjacent walls of the waveguides being provided with apertures to admit rod 97.

In operation, linearly polarized wave energy, supplied to waveguide 64 in the fundamental TE$_{10}$ mode is transmitted equally to waveguides 60, 70, 80, 90 by means of transitional waveguide section 63. In other words, waveguide section 63 serves as a power splitter to divide the energy in waveguide 64 into four equal portions for transmission to wave guides 60, 70, 80, and 90. Proceeding towards the right of Fig. 2, the wave energy in waveguide 90 encounters coupling device 95, including conductive rod or probe 97. Since probe 97 is disposed at right angles to the electric vector E$_t$, representing the wave energy as shown in Fig. 4, none of the energy is transferred from waveguide 90 to waveguide 96. For the same reason, the energy in waveguides 60, 70, and 80 is substantially unaffected by the presence of the other coupling devices 95 which provide coupling to waveguides 66, 76, and 86, respectively. Consequently, equal amounts of TE$_{10}$ mode wave energy are transmitted to mode transducers or dielectric plates 62, 72, 82, and 92, towards the right of Fig. 2.

The manner in which dielectric plates 62, 72, 82, and 92 operate on the wave energy may be readily understood by regarding each electric vector E$_t$ of Fig. 3 as the resultant of two orthogonal electric vector components of equal amplitudes, the one being oriented parallel to a dielectric plate and the other being oriented perpendicular thereto. Since the perpendicular components are substantially unaffected by dielectric plates 62, 72, 82, and 92, whereas the parallel components are delayed thereby, there is produced at the ends of waveguides 60, 70, 80, and 90, towards the right of Fig. 2, waves having orthogonal electric vector components of equal amplitudes but different phases. In particular, the phase difference between each pair of electric vector components is made equal to 90° as is required for circular polarization. This is readily accomplished by properly dimensioning dielectric plates 62, 72, 82, and 92, relative to the operating wavelength as will be apparent to those skilled in the art.

With regard to four signals A, B, C, and D, consisting of circularly polarized waves, wherein the direction of rotation of the electric vectors is opposite to that in the above case, the operation of the waveguide network is as follows. Signals A, B, C, and D are supplied to waveguides 60, 70, 80, and 90 at the right of Fig. 2 where they first encounter dielectric plates 62, 72, 82, and 92. Dielectric plates 62, 72, 82, and 92 convert signals A, B, C, and D to linear polarized wave signals wherein the electric vectors E$_a$, E$_b$, E$_c$, and E$_d$ extend horizontally as shown in Fig. 3. Since the electric vectors are now parallel to rods 97, signals A, B, C, and D are transferred to waveguides 66, 76, 86, and 96. To produce the required error signals [(A+B)−(C+D)], [A+C)−(B+D)], and the range signal [A+B+C+D], signals A, B, C, and D are then combined in the remainder of the waveguide network, as described in connection with Fig. 1.

Referring now to Fig. 5, there is illustrated a modification of the waveguide network of this invention wherein hybrid junctions 20 and 30 of Fig. 1 are replaced by directional couplers 120 and 130. Each of the directional couplers has four arms, designated 121–124, and 131–134, and each is designed to transfer electromagnetic wave energy from any one arm to two of the other arms in equal proportions. Therefore, directional couplers 120 and 130 are operable as hybrid junctions to the extent that one pair of arms, such as arms 123 and 124 or arms 133 and 134, may be readily adapted to provide the individual sum and difference of signals applied simultaneously to the other pair of arms. Also included in this waveguide network are hybrid junctions 140 and 150, like hybrid junctions 40 and 50 of Fig. 1, a power splitter 139, and four mode transducers 111, 112, 113, and 114. Nine terminals, a, b, c, d, w, x, y, z, and t, comprise the terminal ends of the waveguide network.

The manner in which the above described elements are interconnected is as follows. Arms 121, 122, 131, and 132 of directional couplers 120 and 130 are connected to terminals a, b, c, and d through mode transducers 111, 112, 113, and 114, respectively. Arms 123, 124, 133, and 134 of directional couplers 120 and 130 are connected to arms 141, 151, 142, and 152, respectively, of hybrid junctions 140 and 150. The remaining arms of hybrid junctions 140 and 150, namely, arms 143, 144, 153, and 154, terminate at w, x, y, and z, respectively. To complete the network, terminal t is connected to arms 124 and 133 of directional couplers 120 and 130 through power splitter 139.

In operation wave energy supplied to terminal t is divided into two equal proportions by means of power splitter 139. One of the energy portions is supplied to arm 124 of directional coupler 120 and the other portion is supplied to arm 133 of directional coupler 130. Directional coupler 120 divides the one wave energy portion equally in arms 121 and 122 and in like manner directional coupler 130 divides the other wave energy portion equally in arms 131 and 132. Finally, the linearly polarized wave energy in arms 121, 122, 131, and 132 is converted to circular polarization by mode transducers 111, 112, 113, and 114 and then transmitted to terminals a, b, c, and d, respectively.

The operation of the waveguide network with respect to four signal components A, B, C, and D applied to terminals a, b, c, and d, respectively, and consisting of circularly polarized wave energy, may be readily understood with further reference to Fig. 5. Thus, signal components A, B, C, and D are converted to linear polarization by means of mode transducers 111, 112, 113, and 114 and thereafter transmitted to arms 121, 122, 131, and 132, respectively, of directional couplers 120 and 130. Since directional couplers 120 and 130 are adapted to operate like hybrid junctions, there are produced in arms 123 and 124, of directional coupler 130, the complex sum $(A+B)$ and the complex difference $(A-B)$, respectively. Likewise, arms 122 and 134 of directional coupler 130 provide the sum $(C+D)$ and the difference $(C-D)$. The sums $(A+B)$ and $(C+D)$ are then combined in hybrid junction 140 to produce one of the error signals $$[(A+B)-(C+D)]$$

and the range signal $[A+B+C+D]$. The differences $(A-B)$ and $(C-D)$ are combined in hybrid junction 150 to produce the other error signals $[(A+C)-(B+D)]$ and $[(A+D)-(B+C)]$. These signals appear at terminals w, x, y, and z, respectively.

Referring now to Figs. 6–10, the portion of the modified waveguide network above line 145—145 is seen to include in structural form, four waveguide 160, 170, 180, and 190 of square cross section. Waveguide 160 overlies waveguide 180 and is separated therefrom by a common wall 181. Waveguides 170 and 190 which are similarly disposed relative to one another share a common wall 191. Finally, waveguides 170 and 190 are positioned adjacent waveguides 160 and 180, respectively, there being an additional pair of common walls 161 and 171 therebetween.

Included in the respective waveguides towards the right of Fig. 6 are dielectric plates 162, 172, 182, and 192, like dielectric plates 62, 72, 82, and 92, of Fig. 3. Following dielectric plate 172, an additional pair of dielectric plates 101 and 102 are provided. Dielectric plates 101 and 102 are slightly shorter than dielectric plate 172 and each extends between diagonally opposite corners of waveguide 170. Still another pair of dielectric plates 103 and 104 like dielectric plates 101 and 102 are included in waveguide 190.

In a longitudinal region of common walls 161 and 171 towards the left of Fig. 6 there are formed identical groups of slot-shaped apertures 106 and 108, respectively. As shown in Fig. 10, slots 106 are arranged in two rows with their axes parallel to the longitudinal axes of the waveguides. Also, the lines joining the centers of the slots in each row are equidistant from the longitudinal center line of common wall 161. By means of this arrangement of slots 106, waveguide 160 may be directionally coupled to waveguide 170 and the amount of coupling adjusted so that one-half the wave energy in either one of the waveguides is directionally transmitted to the other of the waveguides for both the $TE_{10}$ and $TE_{01}$ modes of propagation; i. e., 3 db directional couplers may be provided for both modes. To this end, the distance separating the rows of slots 106 is made equal to approximately ⅝ the transverse dimensions of the waveguides and the total number of slots utilized is 16, each slot being approximately 0.34 wavelengths long. Since the length of slots 106 and 108 relative to the size of the waveguides in the operating frequency will greatly influence the total number of slots required, however, it will be apparent to those skilled in the art that a greater or lesser number of slots may also be used. In this event a slightly different spacing between rows will also be required as described in detail in the copending application of Louis A. Kurtz, Serial No. 309,262, filed September 12, 1952.

Coupled to the ends of waveguides 170 and 190 towards the right of Fig. 6 is a transitional waveguide section 163 which, in turn, is adapted to receive a waveguide 164 of rectangular cross section. To accomplish this result, the width of section 163 is made equal to the width of waveguide 170 whereas the height of section 163 is reduced from the combined heights of waveguides 170 and 190 to a height which is slightly greater than waveguide 164. This reduction in the height of section 163 is accomplished by means of steps provided in the horizontal walls of section 164 as shown in Fig. 6. To couple waveguide 164 to section 163, the end of section 163, remote from waveguides 170 and 190 is closed by a wall 165 including a rectangular aperture centrally located therein. Waveguide 164 is joined to wall 165 about this aperture. Finally, rectangular waveguides 166, 176, 186, and 196 are coupled to waveguides 160, 170, 180, and 190, respectively, by means of coupling devices 195, which are like the coupling devices 95 of Fig. 4.

In operation linearly polarized wave energy supplied to waveguide 164 in the fundamental $TE_{10}$ mode is transmitted equally to waveguides 170 and 190 by means of transitional waveguide section 163. Thus, waveguide section 163 serves as a power splitter to devide the energy in 164 into two equal portions for transmission to waveguides 170 and 190. Owing to the orientation of the coupling devices 195, the energy in waveguides 170 and 190 is excluded from waveguides 176 and 196 and travels down waveguides 170 and 190 to slot groups 106 and 108. Slot group 106 serves to directionally transmit one-half the wave energy in waveguide 170 to waveguide 160, whereas slot group 180 transmits one-half the wave energy in waveguide 190 to waveguide 180. It is seen from Fig. 8, however, that the phase of the wave energy in waveguides 160 and 180 has been retarded 90° in transfer through the slots. Therefore, dielectric plates 101, 102, 103, and 104 delay the wave energy in waveguides 170 and 190 with respect to the wave energy in waveguides 160 and 180 so as to equalize phases of the wave energy as shown in Fig. 7. Finally, the linearly polarized wave energy is converted to circularly polarized wave energy by dielectric plates 162, 172, 182, and 192 in the manner described in connection with Figs. 1–4.

In the case of signal components A, B, C, and D consisting of circularly polarized waves wherein the electric vector has a direction of rotation opposite to that of vector $E_t$, dielectric plates 162, 172, 182, 192, 101, 102, 103, and 104 operate in reverse fashion. That is to say, dielectric plates 162, 172, 182, and 192 convert signal components A, B, C, and D to linear polarization and dielectric plates 101, 102, 103, and 104 produce a 90° phase difference between signals B, D and A, C. As a result signals A and B are combined by slots 106, the sum of signals A and B being produced in waveguide 160 and the difference $(A-B)$ being produced in waveguide 170 as shown in Fig. 9. With regard to signals C and D in waveguides 180 and 190, respectively, it will also be seen from Fig. 9 that in like manner slots 108 serve to add and subtract signals C and D; signal $(C+D)$ being produced in waveguide 180 and signal $(C-D)$ being produced in waveguide 190. Signals $(A+B)$, $(A-B)$, $(C+D)$, and $(C-D)$ are then transferred to waveguides 166, 176, 186, and 196 by means of coupling devices 195 for transmission to hybrid junctions 140 and 150 which provide the required range and error signals as described in connection with Fig. 5.

What is claimed as new is:

1. An antenna coupling network comprising first, second, third, and fourth mode transducers for converting circularly polarized waves to linearly polarized waves; and first, second, third, and fourth hybrid devices each having four arms, a first and a second of said arms being related conjugately, and a third and a fourth of said arms being related conjugately, the first and second arms of said first and second hybrid devices being individually connected to said first, second, third, and fourth mode transducers, the first arm of said third hybrid device being connected to the third arm of said first hybrid device, the second arm of said third hybrid device being connected to the third arm of said second hybrid device, the first arm of said fourth hybrid device being connected to the fourth arm of said first hybrid device, and the second arm of said fourth hybrid device being connected to the fourth arm of said second hybrid device.

2. An antenna coupling network comprising first, second, third, and fourth waveguide sections of square cross section each one including a dielectric plate extending between diagonally opposite corners of said one of the waveguide sections for converting circularly polarized waves to linearly polarized waves, first, second, third, and fourth hybrid devices each having four arms, a first and a second of said arms being related conjugately and a third and a fourth of said arms being related conjugately, the first and second arms of said first and second hybrid devices being individually connected to said first, second, third, and fourth waveguide sections, the first arm of said third hybrid device being connected to the third arm of said first hybrid device, the second arm of said third hybrid device being connected to the third arm of said second hybrid device, the first arm of said fourth hybrid device being connected to the fourth arm of said first hybrid device, and the second arm of said fourth hybrid device being connected to the fourth arm of said second hybrid device.

3. An antenna coupling network comprising first, second, third, and fourth mode transducers for converting circularly polarized electromagnetic waves to linearly polarized electromagnetic waves; first and second phase shifters for retarding the phase of electromagnetic waves by 90°, said first and second phase shifters being coupled to said second and fourth mode transducers, respectively; a first directional coupler consisting of first and second waveguide sections having a common apertured wall, said first and second waveguide sections being coupled to said first mode transducer and said first phase shifter, respectively; a second directional coupler consisting of third and fourth waveguide sections having a common apertured wall and being disposed parallel and adjacent said first and said second waveguide sections, respectively, said third and fourth waveguide sections being coupled to said third mode transducer and said second phase shifter, respectively; first and second hybrid devices each having four arms, a first of said arms being related conjugately to a second of said arms, and a third of said arms being related conjugately to a fourth of said arms, the first and second arms of said first hybrid junction being connected to said first and third waveguide sections, respectively, and the first and second arms of said second hybrid junction being connected to said second and fourth waveguide sections, respectively; and means for connecting to said second and fourth waveguide sections a fifth waveguide section of rectangular cross section.

4. An antenna coupling network according to claim 3 wherein the apertures provided in each one of the common walls between said first and second waveguide sections and between said third and fourth waveguide sections are arranged in two rows, the line joining the centers of the apertures in one row, and the line joining the centers of the apertures in the other row being parallel to the longitudinal center line of said one of the common walls and being spaced equal distances therefrom.

5. An antenna coupling network comprising first, second, third, and fourth mode transducers for converting circularly polarized waves to linearly polarized waves; first, second, third, and fourth hybrid devices each having four arms, a first and a second of said arms being related conjugately and a third and a fourth of said arms being related conjugately, the first and second arms of said first and second hybrid devices being individually connected to said first, second, third, and fourth mode transducers, the first arm of said third hybrid device being connected to the third arm of said first hybrid device, the second arm of said third hybrid device being connected to the third arm of said second hybrid device, the first arm of said fourth hybrid device being connected to the fourth arm of said first hybrid device, and the second arm of said fourth hybrid device being connected to the fourth arm of said second hybrid device; and a power splitter having an input terminal and two output terminals, said output terminals being connected to the fourth arm of said first hybrid junction and the third arm of said second hybrid junction, respectively.

6. An antenna coupling network comprising first, second, third, and fourth waveguides of square cross section, said first and second waveguides each having one wall common to said third waveguide and another wall common to said fourth waveguide, the common wall between said first and second waveguides, and the common wall between said third and fourth waveguides each being provided with a group of apertures to directionally couple said first waveguide to said second waveguide and said third waveguide to said fourth waveguide at first respective longitudinal regions thereof; first, second, third, and fourth dielectric plates included in a second longitudinal region adjacent said first longitudinal region of said first, second, third, and fourth waveguides, respectively, and extending between diagonally opposite corners thereof; first and second hybrid devices each having four arms, a first of said arms being related conjugately to a second of said arms, and a third of said arms being related conjugately to a fourth of said arms, the first and second arms of said first hybrid junction being connected to said first and third waveguides, respectively, at points within a third longitudinal region thereof adjacent said first longitudinal region, and the first and second arms of said second hybrid junction being connected to said second and fourth waveguides, respectively, at a point within said third longitudinal region; and connecting means for connecting to said second and fourth waveguides a fifth waveguide of rectangular cross section.

7. An antenna coupling network according to claim 6 wherein the apertures provided in each one of the common walls between said first and second waveguides and between said third and fourth waveguides are arranged in two rows, the line joining the centers of the apertures in one row, and the line joining the centers of the apertures in the other row being parallel to the longitudinal center line of said one of the common walls, and being spaced equal distances therefrom.

8. An antenna coupling network according to claim 7 wherein said apertures are shaped in the form of slots having their axes parallel to the longitudinal axes of said waveguides.

9. An antenna coupling network according to claim 6 wherein said connecting means comprises a transitional waveguide section having a width equal to the width of said second and fourth waveguides and a height which decreases from the combined heights of said second and fourth waveguides to a height slightly greater than the narrow transverse dimension of said fifth waveguide.

10. An antenna coupling network comprising first, second, third, and fourth waveguides of square cross section, said first and second waveguides each having one wall common to said third waveguide and another wall common to said fourth waveguide, the common wall between said first and second waveguide, and the common wall between said third and fourth waveguide each being provided with a group of slot-shaped apertures to directionally couple said first waveguide to said second waveguide and said third waveguide to said fourth waveguide at first respective longitudinal regions thereof, means included in said second and fourth waveguides for retarding the phase of electromagnetic waves by 90°, said phase retarding means being located in a second longitudinal region of second and fourth waveguides adjacent said first longitudinal region; first, second, third, and fourth dielectric plates included in a third longitudinal region of said first, second, third, and fourth waveguides, respectively, adjacent said second longitudinal region, the respective plates extending between diagonally opposite corners of the respective waveguides to convert linearly polarized electromagnetic waves to circularly polarized electromagnetic waves; first and second hybrid devices each having four arms, a first of said arms being related conjugately to a second of said arms and a third of said arms being related conjugately to a fourth of said arms, the first and second arms of said first hybrid junction being connected to said first and third waveguides, respectively, at points within a fourth longitudinal region thereof adjacent said first longitudinal region, and the first and second arms of said second hybrid junction being connected to said second and fourth waveguides, respectively, at a point within said fourth longitudinal region; and connecting means for connecting to the ends of said third and fourth waveguides in proximity to said fourth longitudinal region a fifth waveguide of rectangular cross section.

11. An antenna coupling network comprising first, second, third, and fourth mode transducers for converting circularly polarized electromagnetic waves to linearly polarized electromagnetic waves; first and second phase shifters for retarding the phase of electromagnetic waves by 90°, said first and second phase shifters being coupled to said second and fourth mode transducers, respectively; a first directional coupler consisting of first and second waveguide sections having a common apertured wall, said first and second waveguide sections being coupled to said first mode transducer and said first phase shifter, respectively, a second directional coupler consisting of third and fourth waveguide sections having a common apertured wall and being disposed parallel and adjacent said first and said second waveguide sections, respectively, said third and fourth waveguide sections being coupled to said third mode transducer and said second phase shifter, respectively; and connecting means for connecting to said second and fourth waveguide sections a fifth waveguide section of rectangular cross section.

12. An antenna coupling network according to claim 11 wherein said connecting means comprises a transitional waveguide section having a width equal to the width of said second and fourth waveguides and a height which decreases from the combined heights of said second and fourth waveguides to a height slightly greater than the narrow transverse dimension of said fifth waveguide section.

13. An antenna coupling network comprising first, second, third, and fourth mode transducers for converting circularly polarized electromagnetic waves to linearly polarized electromagnetic waves; a power splitter having an input terminal and fourth output terminals, the respective output terminals being connected to said first, second, third, and fourth mode transducers, respectively; and first, second, third, and fourth hybrid devices each having four arms, a first and a second of said arms being related conjugately, and a third and a fourth of said arms being related conjugately, the first and second arms of said first and second hybrid devices being individually connected to said first, second, third, and fourth mode transducers, the first arm of said third hybrid device being connected to the third arm of said first hybrid device, the second arm of said third hybrid device being connected to the third arm of said second hybrid device, the first arm of said fourth hybrid device being connected to the fourth arm of said first hybrid device, and the second arm of said fourth hybrid device being connected to the fourth arm of said second hybrid device.

14. An antenna coupling network according to claim 13 wherein said mode transducers each comprise a waveguide section having a square cross section and being provided with a dielectric plate, said dielectric plate extending between diagonally opposite corners of said waveguide section.

15. An antenna coupling network comprising first, second, third, and fourth waveguides of square cross section, said first and second waveguides each having one wall common to said third waveguide and another wall common to said fourth waveguide, first, second, third, and fourth dielectric plates included in a first longitudinal region of said first, second, third, and fourth waveguides, respectively, and extending between diagonally opposite corners thereof; first, second, third, and fourth hybrid devices each having four arms, a first and a second of said arms being related conjugately, and a third and a fourth of said arms being related conjugately, the first and second arms of said first and second hybrid devices being individually connected to said first, second, third, and fourth waveguides at points within a second longitudinal region thereof, the first arm of said third hybrid device being connected to the third arm of said first hybrid device, the second arm of said third hybrid device being connected to the third arm of said second hybrid device, the first arm of said fourth hybrid device being connected to the fourth arm of said first hybrid device, and the second arm of said fourth hybrid device being connected to the fourth arm of said second hybrid device; and connecting means for connecting to the ends of said first, second, third, and fourth waveguides in proximity to said second longitudinal region, a fifth waveguide of rectangular cross section.

16. An antenna coupling network according to claim 15 wherein said connecting means comprises a transitional waveguide section having a width equal to the combined widths of said first and third waveguides, and a height which decreases from the combined heights of said first and second waveguides to a height slightly greater than the narrower transverse dimension of said fifth waveguide.

17. An antenna coupling network according to claim 16 including a plane member, said plane member covering the smaller end of said transitional waveguide section, and being provided with a rectangular aperture to receive said fifth waveguide.

References Cited in the file of this patent
UNITED STATES PATENTS

| | | |
|---|---|---|
| 2,585,173 | Riblet | Feb. 12, 1952 |
| 2,607,849 | Purcell | Aug. 19, 1952 |